(12) United States Patent
Seelig et al.

(10) Patent No.: US 12,480,878 B2
(45) Date of Patent: Nov. 25, 2025

(54) METHOD AND ILLUMINATION APPARATUS OF ADAPTIVE OPTICS IN REFLECTION MICROSCOPY

(71) Applicant: MAX-PLANCK-GESELLSCHAFT ZUR FOERDERUNG DER WISSENSCHAFTEN E.V., Munich (DE)

(72) Inventors: Johannes Dominik Seelig, Bonn (DE); Ivan Vishniakou, Bonn (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 122 days.

(21) Appl. No.: 18/287,882

(22) PCT Filed: Apr. 21, 2022

(86) PCT No.: PCT/EP2022/060557
§ 371 (c)(1),
(2) Date: Dec. 1, 2023

(87) PCT Pub. No.: WO2022/223695
PCT Pub. Date: Oct. 27, 2022

(65) Prior Publication Data
US 2024/0369487 A1    Nov. 7, 2024

(30) Foreign Application Priority Data
Apr. 22, 2021  (DE) .................... 10 2021 110 263.4

(51) Int. Cl.
*G01N 21/64* (2006.01)
*G01N 21/47* (2006.01)
(Continued)

(52) U.S. Cl.
CPC ..... *G01N 21/6458* (2013.01); *G01N 21/4795* (2013.01); *G02B 21/0032* (2013.01);
(Continued)

(58) Field of Classification Search
CPC .......... G01N 21/6458; G01N 21/4795; G02B 21/0032; G02B 21/0076; G02B 21/008; G02B 27/0012
See application file for complete search history.

(56) References Cited

U.S. PATENT DOCUMENTS 6,169,289 B1 * 1/2001 White ................ G02B 21/0004
250/461.1
9,395,534 B2 7/2016 Sheinis
(Continued)

FOREIGN PATENT DOCUMENTS

DE    10 2007 018 048 A1    10/2008
WO    2014/152739 A2    9/2014

OTHER PUBLICATIONS

Débarre, Delphine, et al. "Image-based adaptive optics for two-photon microscopy." Optics letters 34.16 (2009): 2495-2497 (Year: 2009).*

(Continued)

*Primary Examiner* — Dominic J Bologna
(74) *Attorney, Agent, or Firm* — Norman B. Thot

(57) ABSTRACT

A method for optimizing parameters of a physical light propagation model. The method includes making available a physical model of a light propagation in an optical system, radiating an input-light distribution into an excitation path of the optical system using an illumination unit, passing the input light distribution through a scattering body, wherein the scattering body is placed in the excitation path of the optical system so that the input-light distribution is changed to a reflection-light distribution, recording the reflection- (Continued)

light distribution, transferring the recorded reflection-light distribution to the physical model, and calculating distortion parameters of the physical model based on the reflection-light distribution. The distortion parameters characterize the scattering body. The reflection-light distribution is at least partially reflected as fluorescence radiation by a fluorescence-capable body within the scattering body.

20 Claims, 3 Drawing Sheets

(51) Int. Cl.
  G02B 21/00 (2006.01)
  G02B 27/00 (2006.01)
(52) U.S. Cl.
  CPC ....... G02B 21/0076 (2013.01); G02B 21/008 (2013.01); G02B 27/0012 (2013.01)

(56) References Cited

U.S. PATENT DOCUMENTS

| 2010/0108873 | A1 | 5/2010 | Schwertner |
| 2016/0003740 | A1 | 1/2016 | Tao et al. |
| 2016/0274355 | A1* | 9/2016 | Tao ....................... G02B 21/361 |
| 2022/0196554 | A1* | 6/2022 | Foelling ............. G02B 21/0076 |
| 2023/0273418 | A1* | 8/2023 | Vishniakou .......... G02B 21/008 359/385 |

OTHER PUBLICATIONS

Vishniakou, Ivan, and Johannes D. Seelig. "Differentiable model-based adaptive optics with transmitted and reflected light." Optics Express 28.18 (2020): 26436-26446 (Year: 2020).*
D. Debarre et al.: "Image-based adaptive optics for two-photon microscopy", Optics Letters, vol. 34, No. 16, pp. 2495-2497 (2009).
I. Vishniakou et al.: "Differentiable model-based adaptive optics with transmitted and reflected light", arxiv.org. Cornell University Library (physics.optics), pp. 1-9 (2020).
A. Turpin et al.: "Light scattering control with neural networks in transmission and reflection", arxiv.org. Cornell University Library (physics.optics), pp. 1-31 (2019).
I. Vishniakou et al.: "Adaptive optics with reflected light and deep neural networks", arxiv.org, Cornell University Library, pp. 1-12 (2020).
M. Kellman et al.: "Data-driven design for Fourier Ptychographic Microscopy", IEEE International Conference on Computational Photography (ICCP), pp. 1-8 (2019).
F. Wang et al.: "Phase imaging with an untrained neural network", Science & Applications, vol. 9, pp. 1-7 (2020).

* cited by examiner

METHOD AND ILLUMINATION APPARATUS OF ADAPTIVE OPTICS IN REFLECTION MICROSCOPY

CROSS REFERENCE TO PRIOR APPLICATIONS

This application is a U.S. National Phase application under 35 U.S.C. § 371 of International Application No. PCT/EP2022/060557, filed on Apr. 21, 2022 and which claims benefit to German Patent Application No. 10 2021 110 263.4, filed on Apr. 22, 2021. The International Application was published in German on Oct. 27, 2022 as WO 2022/223695 A1 under PCT Article 21(2).

FIELD

The present invention relates to the technical field of adaptive microscopy and, in particular, adaptive reflection microscopy and its technical applications.

BACKGROUND

In optical microscopy, in particular in optical microscopy of biological samples, imaging is limited by aberrations and scattering. It has here been shown that optical resolution can be improved, for example, when the method of laser scanning microscopy is combined with methods of adaptive optics. This allows aberrations to be reduced by suitable wavefront shaping.

In order to examine a sample having such limited transparency or translucency (i.e., subject to aberrations and light scattering), irradiation light can be analyzed after it has passed through the sample or when it is reflected by the sample. In the case of a sample having limited light-transmissivity, in particular when an image is to be recorded within a scattering material which is optically more accessible from one side than from the other, imaging with reflected light in particular appears more suitable. If a sample is only to be "processed," e.g., using laser light, it is particularly important that, after its transmission through the sample, the laser light radiates onto the sample with a previously defined spatial intensity.

Reflected-light imaging is, however, associated with the difficulty that aberrations occurring in an excitation path (when the irradiation light is steered to the sample) and aberrations occurring in a detection path (the path the light reflected by the sample travels) are generally different and also not easily separated from one another.

Again, in other words: in many applications of (biological) microscopy, when trying to look into tissue or other only partially transparent materials with a light microscope, irradiation light beams are deflected and scattered, resulting in a blurred image with little light. The irradiation light can in particular be provided by a laser that scans over the sample in a raster pattern. This raster scanning can be technically implemented using deflection mirrors. The image thus generated is generally formed by the fact that excitation light which penetrates into the sample from a microscope objective is partially reflected back into the objective and is focused into a "sample image," which is distorted due to the scattering. The distortion of an image within a slightly transparent material is caused by the irradiation light which penetrates into the sample on the excitation path being deflected from its path. The light reflected by the sample behaves similarly: it is scattered back from a plane in the focus of a microscope. This focus plane (or better, focus volume), together with the reflective structures (for example, tissue) there present, can be considered a secondary light source. The reflected light coming from the secondary light source is collected by an objective and focused into an image. The reflected light (or, in other words, the secondary light source) is deflected from its undisturbed path as it travels out of the sample, similar to the irradiation light. The combined deflections of the irradiation light and the reflection light, together with the properties of the reflective material, contribute to the overall distortion of the image.

New methods of "machine learning," in particular using neural networks, offer new approaches for correcting such distortions or aberrations in both transmission and also in reflection that occur during the passage through a scattering body. In order to find corrections for these distortions, the neural networks are typically trained using large synthetically generated data sets. Large data sets are required to adjust the numerous parameters of a neural network and also because the neural networks typically have no knowledge about an underlying image generation process. This means that even physical processes known in themselves are implicitly made accessible to the neural networks via the data sets.

The corresponding training data sets are in practice often based on overlays of so-called "Zernike polynomials," which approximately simulate probably occurring distortions. These are, however, not always able to accurately reproduce actual distortions. The more a scattering body "scatters," the higher orders of these "Zernike polynomials" are necessary to potentially cover all possible "scattering situations" for these cases. Very large data sets will therefore be required in these cases, the generation of which would consume considerable material and time resources.

The publications by Michael Kellman, Emrah Bostan, Michael Chen, and Laura Waller "Data-driven design for Fourier ptychographic microscopy" in 2019 IEEE International Conference on Computational Photography (ICCP), pages 1-8. IEEE, 2019, and by Fei Wang, Yaoming Bian, Haichao Wang, Meng Lyu, Giancarlo Pedrini, Wolfgang Osten, George Barbastathis, and Guohai Situ, "Phase imaging with an untrained neural network", in Light: Science & Applications, 9(1):1-7, 2020, also address issues in this area.

SUMMARY

An aspect of the present invention is to provide a method and an irradiation apparatus with which distortions in an optical system can be effectively reduced.

In an embodiment, the present invention provides a method for optimizing parameters of a physical light propagation model. The method includes making available a physical model of a light propagation in an optical system, radiating an input-light distribution into an excitation path of the optical system using an illumination unit, passing the input light distribution through a scattering body, wherein the scattering body is placed in the excitation path of the optical system so that the input-light distribution is changed to a reflection-light distribution, recording the reflection-light distribution, transferring the recorded reflection-light distribution to the physical model, and calculating distortion parameters of the physical model based on the reflection-light distribution. The distortion parameters characterize the scattering body. The reflection-light distribution is at least partially reflected as fluorescence radiation by a fluorescence-capable body within the scattering body.

BRIEF DESCRIPTION OF THE DRAWINGS

The present invention is described in greater detail below on the basis of embodiments and of the drawings in which.

DETAILED DESCRIPTION

Figure 1:
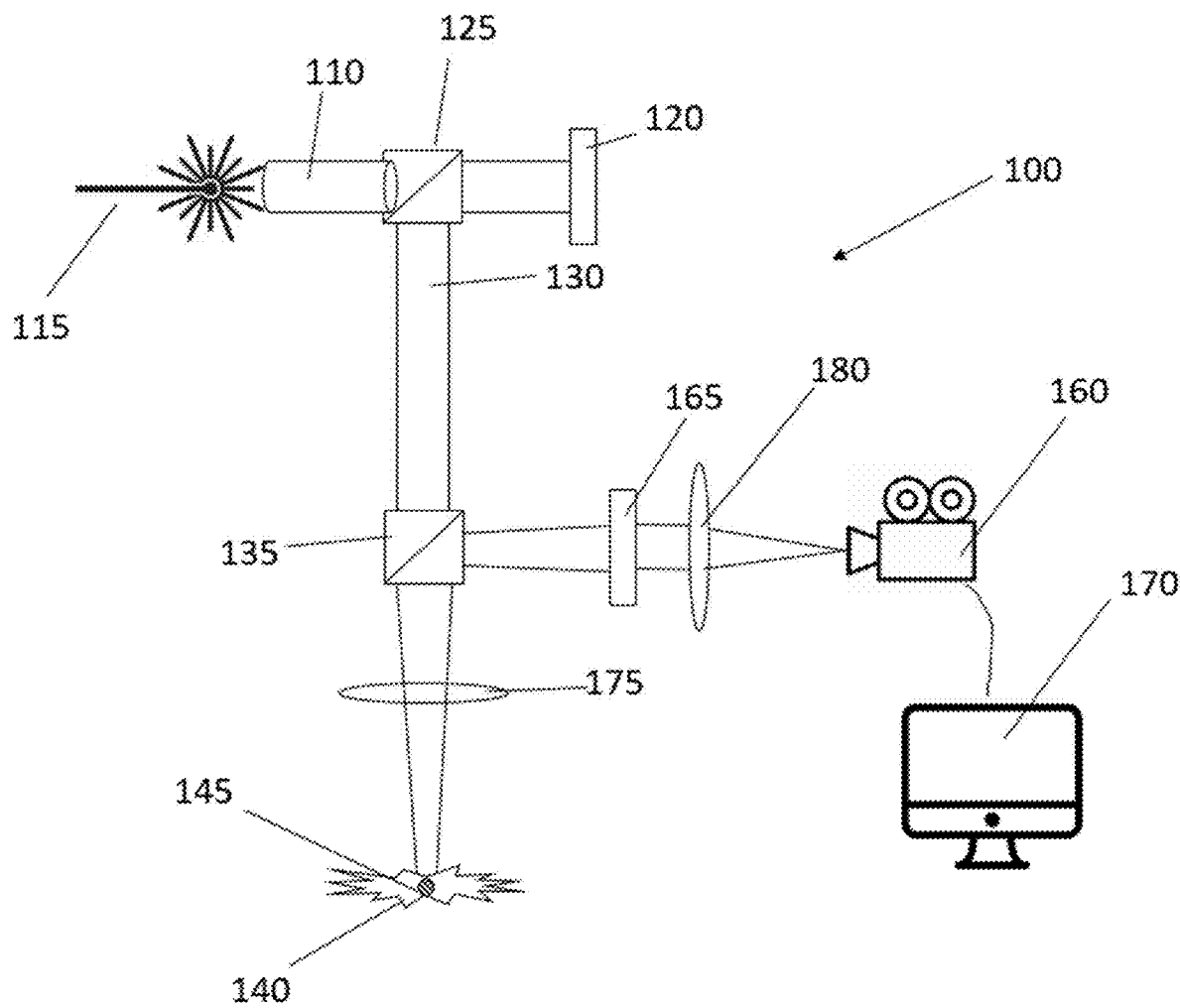
FIG. 1 shows a schematic setup of the adaptive irradiation apparatus.

According to a first aspect, the present invention provides a method for optimizing parameters of a physical light propagation model, in particular of a light propagation model in (confocal) laser microscopy in the raster-scanning method, which comprises the following steps:

a) Making available a physical model $M_{Licht}$ of the light propagation in an optical system, in particular of the light propagation in a microscope. Different physical models can in principle here be used that are able to describe the propagation of light in optical systems. Examples are models of light propagation which are described by matrix optics or by wave optics methods. The presence of the physical model in both cases leads to an "information gain," since the models describe at least undisturbed light propagation in the ideal case (for example, in the ideal case of geometric optics);

b) Radiating an input-light distribution $I_0$ into an excitation path of the optical system via an illumination unit. The input-light distribution $I_0$ is typically radiated with a laser beam which has a Gaussian intensity profile and which can be particularly advantageously focused in the optical system. The optical system can, for example, be used to examine a sample. The light path leading to a sample of the optical system is referred to below as the excitation path since, when the sample is irradiated with the light distribution $I_0$, it is quasi "excited" to illuminate as a "secondary light source." The term excitation path should therefore not be understood to mean that the optical light path leading to the sample is "excited." The input-light distribution $I_0$ can, for example, be known and defined;

c) Passing the light distribution $I_0$ through a scattering body, wherein the scattering body is placed in the excitation path of the optical system and changes the input-light distribution $I_0$ to a transmission-light distribution $I_{TR}$ or $I_0$ to a reflection-light distribution $I_{RE}$; the reflection-light distribution $I_{RE}$ being radiation that is reflected back by the scattering body. The reflection-light distribution $I_{RE}$ in this respect also includes the distortions of the transmission-light distribution $I_{TR}$ up to the location of the scattering body at which the radiation is reflected. The scattering body distorts the input-light distribution $I_0$ and changes it to the reflection-light distribution $I_{RE}$. The scattering body can to a certain extent be regarded as the element that transforms the ideal light propagation according to the physical model $M_{Licht}$ into a real light propagation always with more or less strong distortions;

d) Recording the reflection-light distribution $I_{RE}$ or transmission-light distribution $I_{TR}$. It is in principle possible for the recording unit to record the intensity distribution and/or the phase distribution of the reflection-light distribution $I_{RE}$. The reflection-light distribution $I_{RE}$ can be guided through the optical system and in principle be recorded in any focal plane, for example, at the focal plane in which the sample is actually to be viewed in later applications.

e) Transferring the recorded reflection-light distribution $I_{RE}$ to the model $M_{Licht}$. The known input-light distribution $I_0$ can additionally also be transferred to the $M^{Licht}$, resulting in further information being provided;

f) Calculating distortion parameters V of the model $M_{Licht}$ based on the known input-light distribution $I_0$ and the reflection-light distribution $I_{RE}$, wherein the distortion parameters V in particular characterize the scattering body. A distortion in principal occurs during transmission into the body, which can be referred to as transmission distortion parameter $V_{TR}$, and a further distortion after the light is reflected within the scattering body, which can be referred to as reflection distortion parameter $V_{RE}$. Depending on the measurement setup, both distortion parameters $V_{RE}$ and $V_{TR}$ can be determined independently of each other. However, if only the reflected light is recorded, this includes both the distortion of the transmission and of the reflection. It is in this case therefore appropriate to "combine" both distortion values to form the distortion parameter V. The transmission distortion parameter $V_{TR}$ can in particular be measured when the reflected light is not very coherent with the excitation light, such as in fluorescence excitation and emission, or generally when using a guide star. The reflected or fluorescent light in this case reflects the transmission distortion parameter $V_{TR}$.

A core concept of the present invention that the reflection-light distribution $I_{RE}$ is at least partially reflected as fluorescence radiation by a fluorescence-capable body within the scattering body. If the shape of the fluorescence-capable body and/or the fluorescence excitation states of the body is/are known, this information can be integrated, for example, into the model $M_{Licht}$, or the model $M_{Licht}$ can be used to predict what the reflection-light distribution $I_{RE}$ of the fluorescence-capable body would "actually" have to look like without distortions, as a result of which the distortion parameters V are able to be determined very efficiently and accurately. Since the fluorescence-capable body emits a fluorescence wavelength that is characteristic thereof, it can be reliably distinguished from the emitted wavelengths of the remaining scattering body. Specifically, the fluorescence-capable body can be a sphere having a known diameter. Spherical bodies have the advantage in optics that they are usually analytically particularly good to simulate and/or to model. Due to the scattering, the recorded reflection-light distribution $I_{RE}$ does not show a spherical body in this case but a distorted image, it is, however, possible to determine the distortion parameters V so that the recorded reflection-light distribution $I_{RE}$ is obtained. This is possible precisely because the aforementioned properties of the body are defined and known. This method thus provides an advantageous way to be able to determine the distortion parameters V very efficiently and accurately.

This additionally achieves the advantage that the physical model $M_{Licht}$ of the light propagation in the optical system provides numerous pieces of information about the optical system quasi "a priori," which can be used in the calculation of the distortion parameters V in order to make this calculation much more efficient than with conventional machine learning approaches (in particular via neural networks). Conventional "machine learning" requires a very large amount of training data in particular in the case of large distortions caused by the scattering body—also because the used neural networks have no information about the underlying optical system and have to quasi additionally model it. Using the combination according to the present invention of a "machine learning" environment with the information about the optical system provided by the physical model $M_{Licht}$, it is possible to determine the distortion parameters V much more efficiently with a much smaller set of measurement data or training data. The method also offers the advantage that no artificial "Zernike modes" are used to find the distortions, but a real scattering body, which can, for example, also be used in later applications. If the distortion parameters V are known, it is possible to determine how a light beam passes through the optical system in the transmission direction and what distortions it experiences during this passage.

Distortions that are generated within a sample during the passage of the light are in particular characterized. This is achieved, for example, by the physical model $M_{Licht}$ of the optical system being used, so that it is known how the light would "actually" have to pass through the optical system and, in addition, the reflection-light distribution $I_{RE}$ is recorded at least partially as fluorescence radiation from a fluorescence-capable "defined" body introduced into the sample/scattering body. Since it is, for example, known what the defined body should actually "look like" in the recorded image without distortions, the distortions that match its "actually" recorded image can be calculated. It is therefore expedient that the shape of the fluorescence-capable body and/or the fluorescence excitation states of the body are known. Making available the physical model $M_{Licht}$ of the optical system leads to an important information gain compared with conventional machine learning methods.

The excitation states of the fluorescent body can, for example, be selected so that the laser light required for excitation can pass through the scattering body with as little distortion as possible. In an alternative configuration, the fluorescent body is selected according to the wavelength to be used for subsequent microscopy examinations of the scattering body. If the scattering body is, for example, to be examined in later examinations with a wavelength of, for example, 400 nm, it is thus advantageous to select a fluorescent body whose excitation states are less than or equal to 400 nm. This is advantageous because light of different wavelengths can in general also result in different distortion parameters.

Any fluorescence-capable, scatterable or arbitrarily differently excitable body, which is in particular smaller than the excitation focus, can generally be used to determine the distortion parameters.

Expediently, a focus of the input-light distribution $I_0$ is greater than a spatial extent of the fluorescence-capable body orthogonal to the direction of irradiation.

It has been shown to be advantageous if the focus of the laser light is larger in its dimensions than the dimensions of the scattering body. This makes it possible that, when the laser travels over the scattering body in a raster-scanning method, the complete distortion image of the body can be imaged practically in a single recording at a single grid point precisely where the fluorescent sphere is located. If the focus of the laser light were smaller than the dimensions of the scattering body, a plurality of images must necessarily be combined to form a single overall image of the scattering body. This potentially results in undesirable inaccuracies in the determination of the distortion parameters V.

The fluorescent body can, for example, be spherical. This offers the advantage that spherical bodies can be simulated and/or mathematically analyzed using physical models particularly well.

2-photon fluorescence can, for example, be used for exciting the fluorescence-capable body.

Various possibilities exist to excite the fluorescent body to fluorescence. The simplest case is by the 1-photon excitation. In each case, a single photon raises the electrons of the fluorescent body into a higher fluorescence excitation state.

In this context, however, the multi-photon excitation, in particular the 2-photon excitation, proves to be technically advantageous. This is because when the laser light reaches a certain power density, it is possible to raise an electron into the fluorescence excitation state not by a single photon with a wavelength of, for example, 480 nm, but by two photons of 480 nm each. With the aid of a strong, focused laser beam, nonlinear optical effects are generated which are based on the interaction between a plurality of photons (light particles) arriving simultaneously in a molecule. The strength of the generated signal does not therefore increase linearly with the number of radiated photons, but with the square (in the case of two-photon effects) or the third power (in the case of three-photon effects). The operation of a multiphoton microscope is similar to that of a confocal laser scanning microscope. However, while confocal laser scanning microscopy has a penetration depth of 50-80 µm depending on the specimen, multi-photon microscopy can achieve deeper regions, for example, of 200 µm, and in very favorable cases even up to 1000 µm (=1 mm). This allows the recording of live tissues that are otherwise unattainable for imaging. Although this method is technically more complex, and the microscopes and/or the laser is/are therefore also more expensive, it offers, among others, the following technical advantages.

As shown above, the generation of the two-photon effect requires a very high photon density, which can normally only be achieved by a pulsed laser. Yet even in this case it is only at the focal point that a sufficiently high photon density to generate fluorescence excitation occurs. Outside of the focus plane, the same amount of excitation photons is distributed over a greatly increasing diameter of the beam cone. However, two-photon excitation depends on the square of the light intensity, so that the light intensities outside of the focus plane are no longer sufficient for the generation of fluorescence, unlike in other fluorescence microscopes. This provides practical advantages:

Bleaching of fluorescent dyes and phototoxicity generation are limited to an extremely small area surrounding the focal point. Planes above and below are not affected.

All fluorescence captured by the objective can be used for the image to be created. In contrast to confocal laser scanning microscopes, no pinhole is needed to filter out light from other planes. In contrast with confocal laser scanning microscopes, it is therefore also not necessary to capture the fluorescence via the scanning mirrors. A "non-descanned detection" can instead be performed. The detection can thus be effected spatially closer to the specimen, which in turn allows for the capture of a part of the fluorescence scattered in the specimen.

An independent advantage is the higher penetration depth due to the lower scattering of longer-wave light. The scattering cross section σ depends very strongly on the frequency ν and increases proportionally to ν4. Short-wave violet light (400 nm) has twice the frequency of long-wave red light (800 nm) and is therefore scattered 16 times as much. Wavelength-dependent scattering also occurs in biological tissues: when a strong flashlight is shone through a hand, almost only the red light component penetrates. Since infrared or dark red light is used for fluorescence excitation in two-photon microscopy, correspondingly deeper regions can be reached.

According to one aspect of the present invention, the reflection-light distribution $I_{RE}$ is recorded with a camera at a possible location of a sample. A CCD camera or a CMOS camera can be used for this purpose. The cameras must thereby be particularly photosensitive since the reflection-light distribution $I_{RE}$ is generated by the fluorescence of the fluorescence-capable body and therefore only has a low light intensity. Multiple cameras which have slightly different focal planes could also be used to gain additional information. Both types of cameras listed as examples are characterized by a high spatial resolution. The higher the spatial resolution of the camera used, the more information about the optical system can be recorded, and the more accurately the distortion parameters V can be calculated. For reflection experiments, a camera is required only in the reflection path. Reflection experiments are an important configuration for microscopy applications because in this case a focus within a scattering body is considered to be reflected light. Owing to the low light intensity of the reflection-light distribution $I_{RE}$ due to the fluorescence, a photomultiplier can, for example, be used for recording the reflection-light distribution $I_{RE}$. Such a photomultiplier offers the advantage of being able to record and resolve even the smallest light intensities. The amount of light recorded by the photomultiplier can be increased by setting the laser to raster-scan over predefined points of the scattering body over a longer period of time.

In the case of a diffraction-limited guide star, the recorded intensity reflects the transmission-light distribution $I_{TR}$.

An n-fold reflection-light distribution data set; n-$I_{RE}$, can, for example, be generated by an n-fold variation of the input-light distribution $I_0$. This has the advantage that the distortion parameters V can thus be calculated much more precisely, since possible variations of the optical system during irradiation of only a single constant input-light distribution $I_0$ are not sufficient to adequately characterize the scattering body. This is in particular the case if other intensities than the input-light distribution $I_0$ are also to be used for later applications. In particular, with a strong variation in the amplitude of the intensity of the input-light distribution $I_0$, higher-order optical effects, which can be characterized by a data set n-$I_{RE}$, may occur within the scattering body. It should be noted that the set of the data set n-$I_{TR}$ is significantly smaller than in the conventional "machine learning" methods described above.

The light distribution is expediently varied via a spatial light modulator ("SLM") which modulates the profile of the light beam. For many applications, controlling the phase and intensity of the light beam is of great importance. The SLM based on liquid crystals can, for example, be used for phase modulation. It is in this case appropriate to use phase patterns for training the neural network. The spatial light modulator may alternatively be a digital mirror for generating a binary intensity pattern. Known high-speed digital micromirror devices (DMDs) can generate binary patterns of high and low values (1 and 0) with a frame rate of 22.7 kHz. If, for example, a continuous wave laser is used, which radiates continuously onto the digital mirror, it is possible to generate an n-tuple ($I_{Ei}$, $I_{Ai}$) with this frequency. This DMD can also be used to generate phase patterns. It is in principal possible to vary a plurality of light parameters (intensity, phase, and polarization) simultaneously using a combination of a plurality of optical modulators or using one modulator to obtain the best possible control over the light distribution. This makes the method even more flexible and accurate.

The model $M_{Licht}$ can, for example, be made available on a computer unit, and an algorithm implemented on the computer unit calculates the transmission distortion parameters $V_{TR}$ automatically.

This offers the advantage that the method for calculating the distortion parameters V can be carried out quickly, efficiently, and automatically, so that a user does not necessarily need to be present when carrying out the necessary experiments.

In an embodiment, a differentiable model can, for example, be used as the physical model $M_{Licht}$ of the light propagation.

A differentiable model, i.e., a model that is in particular analytically differentiable, offers the advantage of smaller errors and fewer calculation steps than would be the case with numerical methods. In order to find the parameters of the model, in particular the distortion parameters V, the parameters of the model are "changed" until the model prescribes the measured data set, i.e., the recorded transmission-light distribution $I_{TR}$, as accurately as possible. This optimization problem can be solved by finding a minimum of the first derivative of the differentiable model. The differentiable model maps the input and output of the optical system. Automated differentiation can in particular be carried out which is part of "machine learning" frameworks such as TensorFlow. Automatic differentiation is used in these frameworks to calculate gradients to optimize a loss function with respect to parameters of interest. The loss function compares the model output with a target output, and the discrepancy is minimized by adjusting the model parameters.

Both transmission distribution parameter $V_{TR}$ and reflection distortion parameter $V_{RE}$ of the model $M_{Licht}$ can, for example, be calculated based on the recorded reflection-light distribution $I_{RE}$. It is sufficient to record only $I_{RE}$ to determine $V_{TR}$ and $V_{RE}$ and subsequently optimize the model with respect to both distortion parameters.

This offers the advantage that the adapted parameters of the optical model $M_{Licht}$ can describe, or model, both the transmission and the reflection of the light beam. This information can in particular be used for applications in reflection microscopy.

An n-fold reflection-light distribution data set, n-$I_{RE}$, can, for example, be generated by an n-fold variation of the input-light distribution $I_0$. Any reflective or backscattering sample can be used for this purpose; it is only necessary to be able to determine the origin of the scattered light downstream of or within a scattering body. This results in an analogous advantage as explained above in connection with the data set n-$I_{RE}$.

The model $M_{Licht}$ can, for example, be made available on a computer unit, wherein the algorithm implemented on the computer unit simultaneously calculates the transmission distortion parameter $V_{TR}$ and the reflection distortion parameter $V_{RE}$ automatically with the aid of only the reflection-light distribution data set.

In a second aspect, the present invention provides an irradiation apparatus, in particular a laser reflection microscope, which is suitable for carrying out one of the methods described above. The irradiation apparatus has:
  a microscope comprising:
    an illumination unit, in particular a laser, which is designed to generate a light distribution $I_0$, for example, a pulsed laser set up for 2-photon microscopy;

an excitation path with a scattering body "A" provided in the excitation path, wherein the excitation path guides the light distribution $I_0$ to the location of a sample;

a photomultiplier which records light $I_{RE}$ reflected by the scattering body; and a computer unit, wherein the above-described physical model $M_{Licht}$ of the light propagation in the irradiation apparatus is made available on the computer unit and wherein an algorithm implemented on the computer unit is configured to calculate, based on $M_{Licht}$ and $I_{RE}$, transmission distortion parameter $V_{TR}$ and/or transmission distortion parameter $V_{RE}$ of the model $M_{Licht}$.

A core concept of the present invention is to provide a fluorescence-capable body within the scattering body A (140), wherein the reflection-light distribution $I_{RE}$ is at least partially reflected as fluorescence radiation by the fluorescence-capable body within the scattering body.

This achieves the advantage that the distortion parameters V can be calculated significantly more efficiently by the irradiation apparatus than with conventional techniques of "machine learning", in particular by using the defined and known properties of the fluorescence-capable body for the calculation of the distortion parameters V as further information. The "real scattering body" allows a generation of distortion parameters that is not merely hypothetical.

In a third aspect, the present invention provides a method for correcting distortions of a light distribution $I_1$ during passage through an optical system with a scattering body, in particular in laser microscopy in the raster-scanning method when irradiating a sample. The method includes the following steps:

a) extracting a distortion parameter V with features of the method described above; and b) setting a complementary distortion pattern $V^{\#}$ on an optical modulator, in particular an SLM, of the excitation path, wherein the optical modulator is arranged upstream of the scattering body in the beam direction. The complementary distortion pattern $V^{\#}$ is based on the complex conjugate pattern to V.

The method can, for example, be modified if distortions are to be corrected in which the light distribution $I_1$ is additionally distorted in the reflection path and the light distribution $I_1$ is to be viewed with the best possible resolution for example after reflection at the sample. The transmission distortion parameter $V_{TR}$ and a reflection distortion parameter $V_{RE}$ are in this case extracted simultaneously, wherein only the reflection-light distributions are recorded in the corresponding measurements—for example, without measuring the transmission-light distributions.

This in particular involves the same scattering body or at least a scattering body with similar optical properties as the scattering body with which $V_{RE}$ and/or $V_{TR}$ were calculated.

If, in a next step, the light distribution $I_1$ is radiated into the optical system, the light distribution $I_1$ is changed in advance by the distortion pattern $V_{TR}^{\#}$ that has been set on the optical modulator so that the subsequent distortion $V_{TR}$ caused by the scattering body is compensated so that, ideally, a light distribution that corresponds to the incoming light distribution $I_1$ will arrive at the location of the sample. The optical distortions due to the scattering body are thus effectively corrected, which is particularly advantageous for many applications. Applications include all situations that can benefit from controlling a light distribution within or through a scattering body, e.g., in microscopy with reflected light or with fluorescent light or other contrast methods. Another application involves e.g., cutting of tissues or bones with the help of laser surgery. In this case, imaging or diagnostics with the microscope could, for example, be combined with cutting using the laser in the same device, wherein only the intensity or wavelength need be adapted. Macroscopic applications are also conceivable, e.g., optical signal transmission through scattering materials such as fog.

When exiting the sample, the light distribution $I_1$ is in turn distorted by scatter effects corresponding to the factor $V_{RE}$, which are in turn compensated by the fact that a further optical modulator is arranged in the reflection path in the beam direction downstream of the exit of the light from the sample. The complementary distortion pattern $V_{RE}^{\#}$ is set accordingly on the further optical modulator to compensate for the optical distortions $V_{RE}$. This method allows the distortions induced by the sample to be corrected as far as possible and the image of the sample to be detected with a high resolution, or a sample to be irradiated with a defined spatial resolved intensity.

In a fourth aspect, the present invention provides an irradiation apparatus which is configured to correct distortions of a light distribution $I_1$ when passing through an optical system with a scattering body according to one of the methods described above. The irradiation apparatus, a laser reflection microscope, has:

a microscope comprising,
  an illumination unit, in particular a laser, designed for generating a light distribution $I_0$, and
  an excitation path with a scattering body provided in the excitation path, wherein the excitation path guides the light distribution $I_0$ to the location of a sample. This in particular involves the same scattering body or at least a scattering body with similar optical properties as the scattering body with which the values for V, $V_{RE}$ and/or $V_{TR}$ were calculated;

an optical modulator which is provided in the excitation path in the direction of light propagation upstream of the scattering body; and a computer unit designed for controlling the optical modulator, wherein the computer unit is configured to extract distortion parameters V from a physical model $M_{Licht}$ of the light propagation in the irradiation apparatus and to set the optical modulator with a complementary distortion pattern $V^{\#}$ correcting the distortions due to the scattering body.

The illumination apparatus can, for example, additionally have a further optical modulator in the reflection path downstream of the exit of the light from the sample, wherein the complementary distortion pattern $V_{RE}^{\#}$ is set on the further optical modulator. In this case, $V_{TR}^{\#}$ is set on the first optical modulator in the excitation path.

With this illumination apparatus, distortions of a light beam during passage through the optical system in transmission can be effectively reduced, in particular distortions caused by the scattering body. The further optical modulator effectively corrects a distorted image of a sample in reflection microscopy so that an image of the sample can be recorded by the microscope at a higher resolution.

Exemplary embodiments of the present invention are explained below with reference to the drawings.

In the following text, numerous features of the present invention are explained in detail using embodiments. The present invention is not thereby limited to the specific combinations of features mentioned. The features here mentioned here can much rather be combined as desired to form embodiments according to the present invention, unless expressly excluded below.

FIG. 1 illustrates the setup for ascertaining the distortions caused by a scattering body as well as a corresponding correction of these distortions in the transmission and/or reflection direction.

Within the scope of the present invention, a model optimization strategy for adaptive optics is specified: The light propagation through an optical system 100 (in particular if the optical system is a 2-photon laser reflection microscope 100) is described, including the unknown aberrations presented as parameters, with a differentiable model $M_{Licht}$.

In order to adapt the input-output ratio of the computational model $M_{Licht}$ to the experimental setup, a large number of output images resulting from corresponding input phase modulations are recorded. These input phase modulations are generated by a pulsed laser 115 first generating an input-light distribution $I_0$ 110 and the latter then being directed to a spatial light modulator "SLM" 120. Different patterns which cause an input phase modulation of the input-light distribution $I_0$ 110 are supplied to the SLM 120 for the respective test runs. As shown in detail below, the model parameters can be optimized with the TensorFlow program. Distortion parameters of the transmitted light $V_{TR}$ and of the reflected light $V_{RE}$ are in particular found by the modeling, which allow an accurate description of the scattering body.

The experimental setup is schematically illustrated in FIG. 1. FIG. 1 shows an expanded and collimated laser beam which is generated by the pulsed laser 115 and modulated as input-light distribution $I_0$ 110 by the first spatial light modulator SLM 120 and guided to a deflection mirror arrangement 125 and guided therefrom into an excitation path 130. Via adjustable mirrors in the deflection mirror arrangement 125, the input-light distribution $I_0$ 110 can be "raster-scanned" over different points of a plane in particular via an adjustment of the adjustable mirrors.

The modulated light distribution $I_0$ passes through a beam splitter 135 and then radiates into a scattering body 140 in the transmission direction, which causes a transmission distortion $V_{TR}$ of the light distribution $I_0$. Within the scattering body 140, a fluorescence-capable body 145 is provided, which is excited by a correspondingly set wavelength of the light distribution $I_0$ to emit fluorescence radiation, wherein the emitted fluorescence radiation is at least partially radiated into the excitation path and can thus be regarded as reflection-light distribution $I_{RE}$ reflected by the fluorescence-capable body 145. When again passing through the scattering body 140, the reflection-light distribution $I_{RE}$ is again distorted. This distortion can be referred to as reflection distortion $V_{RE}$. Expediently, the reflection distortion $V_{RE}$ and the transmission distortion $V_{TR}$ can be combined to form the total distortion V.

After leaving the scattering body 140, the reflection-light distribution $I_{RE}$ is again incident on the beam splitter 135, which steers the reflection-light distribution $I_{RE}$ into a photomultiplier 160 via a lens 180. A correction of the reflection distortion $V_{RE}$ can be carried out by a second spatial light modulator 165, which is implemented in the beam path of the reflected light.

To optimize the parameters of the model $M_{Licht}$, the photomultiplier can be directly connected to a computer unit 170 and transmit their respective measurements to the computer unit 170. On the computer unit 170, the model $M_{Licht}$ and a corresponding algorithm for the calculation of the parameters are made available, so that the measurement of the cameras can be passed directly as input to the algorithm.

Lenses 175, 180 provided in the optical system are used for beam guidance or beam focusing.

The model $M_{Licht}$ is described in detail in an embodiment below:

Light passing through the optical system 100 is described by a complex amplitude U(x, y, z) initialized by $U_0$=U(x, y, 0). This complex amplitude passes through a sequence of planar phase objects and propagates in-between in a free space along the optical axis (z-axis; x, y, z are spatial coordinates). A wavefront U(x, y, d) that interacts with a phase object $\pi$(x, y, d) in the plane D can be described by the following multiplication:

$$U(x, y, d)\exp[i\phi(x, y, d)] \qquad (1)$$

The propagation of the wavefront in a free space over a distance d is calculated using the angular spectrum method with the following operator:

$$U(x, y, z+d) = P_d(U(x, y, z)) = \qquad (2)$$
$$\int\int A(f_x, f_y; z) \mathrm{circ}\left(\sqrt{(\lambda f_X)^2 + (\lambda f_Y)^2}\right) \times H\exp[i2\pi(f_X x + f_Y y)]df_X df_Y.$$

with $A(f_X, f_Y; z)$ being the Fourier transform of U(x, y, z), $f_X$ and $f_Y$ being spatial frequencies and the circ function being 1 within a radius in the argument and 0 outside; and $H(f_X, f_Y)$=exp $$\left[i\pi\frac{d}{\lambda}\sqrt{1 - (\lambda f_X)^2 - (\lambda f_Y)^2}\right]$$

being the optical transfer function.

The intensities recorded by the photomultiplier 160 are also determined:

$$I(x, y, z) = |U(x, y, z)|^2. \qquad (3)$$

In two-photon imaging, the induced fluorescence intensity is proportional to the square of the excitation intensity:

$$I_f \propto I^2 = |U|^4 \qquad (4)$$

These equations are used to simulate the image of the fluorescence-capable body 145 in the microscope (or the PSF) with the following function, taking into account that the propagating wavefront is modulated by the SLM and the phase aberration of the sample:

$$I_f = S(\phi_{SLM}, \phi_{aberration}) = \left|P_{f_{MO}}(U_0 \cdot \exp[i(\phi_{SLM} + \phi_{MO} + \phi_{aberration})])\right|^4, \qquad (5)$$

where $\phi_{SLM}$ is the SLM phase modulation, $\phi_{aberration}$ is the phase surface of the aberration, $U_0$ is the (complex) amplitude of the beam cross section, and $f_{MO}$ and $\phi_{MO}$ are the focal length and the corresponding phase modulation of the microscope objective. The SLM modulation is modeled directly in the same z-plane as the objective, eliminating the need for insignificant calculations because it is in the plane conjugate to the objective. The aberration is likewise modeled in the same plane, which saves calculations and simplifies the correction: Since the phase function of the aberration is found in the SLM plane, its inverse can be applied directly to the SLM without the need for additional calculations of the propagation between different planes.

The model equation (5) contains definable parameters $U_0$, $f_{MO}$ and $\phi_{MO}$, which are adapted to the experimental setup, or correspond to it, in that the corresponding actual sizes of the experimental setup are used for the parameters. Slight rotational deviations of the SLM in the image plane were additionally observed and compensated for by corresponding counter-rotations of the recorded fluorescence images, since such rotations could not be corrected by an adaptation of the SLM phase. A fixed zoom level and a fixed field of view were used for all experiments, and the model was adapted with respect to these conditions, wherein a plurality of models could also be used simultaneously, adapted for different zoom levels. The resolution of the simulations was limited by the discretization of the beam cross section, and the focal length $f_{MO}$ of the simulated objective was therefore increased in order to obtain proportionally magnified images. It was assumed that $U_0$ has a Gaussian beam profile with a "flat phase." $U_0$ was discretized in 512×512 pixels.

Other parameters of the model equation were manually set as follows. First, a sparse aberration-free fluorescent guide star (fluorescent spheres of 1 µm diameter embedded in 3% agarose) as a fluorescence-capable body 145 was illuminated at different modulations (Zernike modes Z1 to Z10, which were shown successively with changing values). The parameters were then set manually to achieve a good match between the calculated and the actual images. This manual matching method was validated by performing the model optimization for the corrections in the absence of introduced sample aberrations. After successful parameter optimization, the system's residual aberrations were near zero, suggesting that the computational model of the experimental microscope setup corresponds well to the actual experimental microscope setup.

Pre-Processing Fluorescence Images

Figure 2:
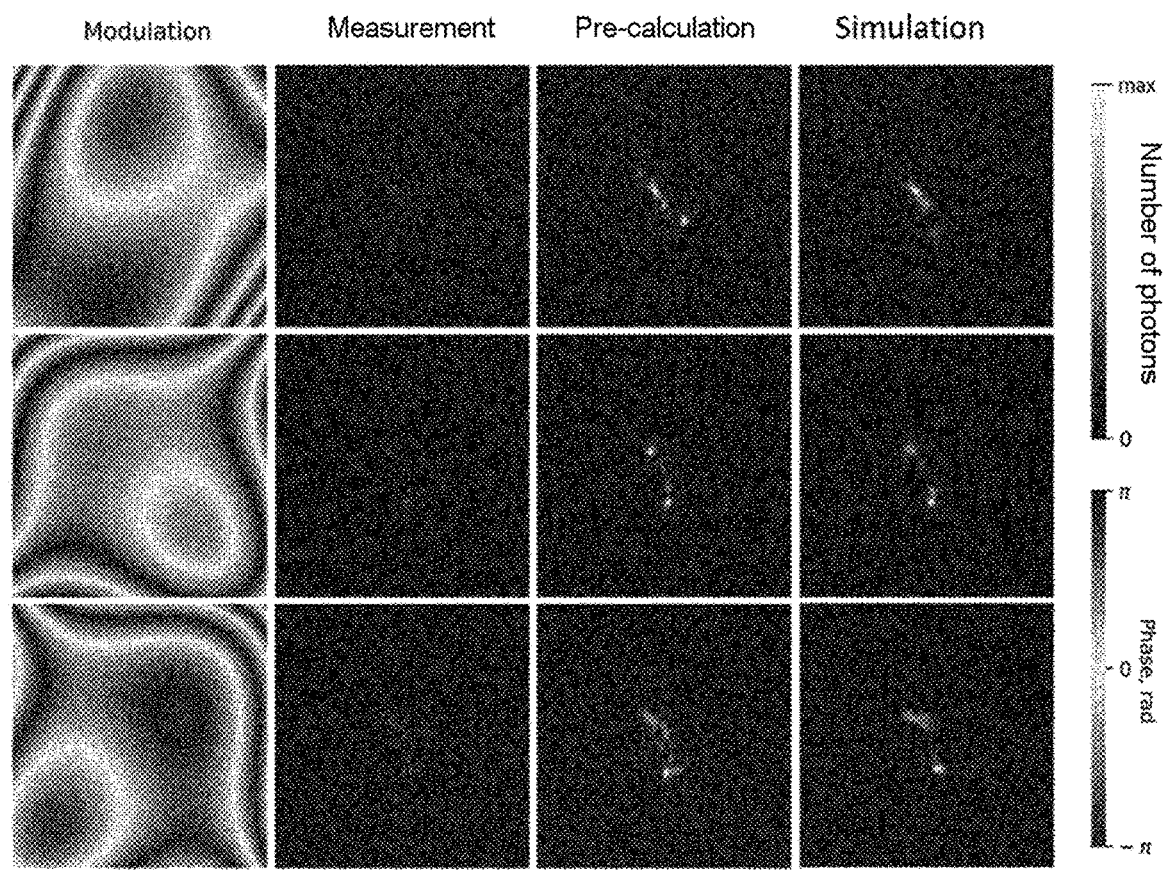
FIG. 2 shows measurements and a simulation of the influence of a fluorescence-capable body on an incoming input-light distribution.

The fluorescence images were recorded by photon counting with a resolution of 512×512 pixels at 30 Hz. This resulted in sparsely lit images with a low number of photons per pixel, with many discontinuities (gaps) in the intensities that make it difficult to correctly estimate the similarity to the model output. All fluorescence images were therefore pre-processed with a low pass filter. The images were subjected to a discrete Fourier transformation, and frequencies exceeding 0.15 of the pattern resolution were discarded prior to the inverse transformation. Examples of images before and after pre-processing are shown in FIG. 2 (column two and three, respectively).

Model Optimization and Loss Function

For the corrections in imaging in a distorted sample, an individual fluorescent guide star was centered in the field of view as a fluorescence-capable body 145 within the scattering body 140 and N random modulations (typically 20, each generated by summing the Zernike modes Z1 to Z10 with coefficients of a uniform random distribution in the range -1 . . . 1) were created by changes to the SLM while the corresponding fluorescent images $I_f$ were recorded with the photomultiplier 160. The unknown aberration phase function was then found in an optimization process with the specified goal of matching measured and simulated images:

$$\underset{\phi_{aberration}}{\operatorname{argmin}} \sum_{j=1}^{N} \operatorname{loss}(S(\phi_{SLM_j}, \phi_{aberration}), I_{f_j}) \quad (6)$$

Here, $SLM_j$ and $\phi_{aberration\,j}$ are pairs of SLM modulations and corresponding fluorescent images recorded in the two-photon microscope. S is the microscope model as specified in (5). The loss function is defined to quantify the similarity between simulated and measured fluorescence images:

$$\operatorname{loss}(\text{prediction}, \text{target}) = -r[\text{prediction}, \text{target}] \cdot \ln\left(\sum^{pixels} |\text{prediction}|\right), \quad (7)$$

where r [prediction, target] is the Pearson correlation coefficient and $\ln(\Sigma^{pixels}|\text{prediction}|)$ is an additional cost factor for intensity maintenance. Since the Pearson correlation coefficient is not dependent on the size of the prediction, the optimizer is likely to converge to a solution that provides a high correlation but discards some of the light by redirecting it from the field of view, and therefore usually does not lead to good corrections. The additional introduction of the sum of the total intensity promotes solutions that do not discard the excitation intensity. The logarithm provides that the slope of this regulating factor is always smaller than that of the correlation coefficient, making it a secondary "optimization goal."

The model (5) was implemented with "TensorFlow 2.4" by adapting an "angular spectrum method" and using the optimization algorithm "Adam" with a learning rate of 0.01.

According to equation (5), the phase $\phi_{aberration}$ is represented as a real-value tensor, which is a prerequisite for optimization variables in TensorFlow. All modulations and pattern responses were packed into a single stack and used at once in each iteration of the optimizer. 1000 optimization steps were typically sufficient to achieve a correlation coefficient of >0.9 of the model with the observation. The optimization took between 1 and 2 minutes on a workstation with four Nvidia Titan RTX GPUs in data-parallel mode. The resulting aberration phase function was negated (multiplied by 1) for the representation on the SLM (multiplied by 1), thereby correcting the aberration.

The method now works as follows:

In order to implement a differentiable model-based adaptive optics for two-photon microscopy, a differentiable model of the setup must first be created. The main elements of the setup model are shown in FIG. 1.

As already described above: the model (5) consists at least of a phase modulation which describes the spatial light modulator (SLM) 120 and of a phase function which describes the focusing objective, and thirdly of an (unknown) phase aberration of the sample.

An expanded laser beam is reflected by the spatial light modulator 120, imaged onto a pair of (resonant) scanner mirrors as the deflection mirror arrangement 125, which in turn are imaged into the rear focal plane of the microscope objective.

The fluorescence light is detected in an "epidetection configuration" with the photomultiplier 160 via a dichroic mirror.

In a first step, the model (5) is adapted to the setup of the microscope 100 by manually adapting the model parameters in the absence of the scattering body 140. For this purpose, a fluorescent sphere of 1 μm embedded in agarose was used as the fluorescence-capable body 145. By presenting any phase modulations on the SLM 120, the resulting point-spread functions (PSFs) can be observed by scanning the fluorescence-capable body 145, which were here fluorescent spheres.

The model (5) captures the transformation of the SLM phase pattern into the resulting fluorescence PSF (Point Spread Function). The model parameters were therefore set so that the computational transformation of the phase patterns shown on the SLM 120 into the resulting PSFs accurately describes the experimentally observed transformations. As can be seen in FIG. 2, after the adjustment of the model parameters, a good agreement between experimentally observed patterns and computationally generated patterns was achieved.

FIG. 2 describes a correspondence between computationally generated images and experimentally measured images of the fluorescent sphere 145. Three representative examples (one example per row), recorded after correction of a distorting sample: modulations shown on the SLM 120 (first column) and corresponding PSF images as measured with photomultiplier 160 (second column), pre-processed for the fitting model (third column) and simulated with the values extracted from the fit that were inserted into the model (5). The size of the field of view is 40 μm×40 μm.

As shown in FIG. 2, after the calculation of the model parameters, a good agreement between experimentally observed patterns and computationally generated patterns was achieved.

Distortions Due to the Scattering Body 140

Sample aberrations introduce an unknown phase function into the optical setup of the microscope 100. To computationally show this situation, a phase surface is added to the model as a set of free parameters.

This unknown phase surface must be adapted by the optimization so that it describes the distortions. After successful optimization, the aberration phase surface is known, which is verified by the fact that the model (5) again matches the optical setup of the microscope 100 (FIG. 2). With this knowledge, corrections can now be made by pre-setting the SLM 120 accordingly to correct the distortions.

The optimization process as implemented here takes advantage of familiar machine learning frameworks. Optimization in these frameworks relies on a differentiable model that is optimized by automatic differentiation in combination with gradient descent optimization. One advantage of this approach is the efficient implementation of optimization on a GPU, for example, in TensorFlow, which was here used.

To test the approach experimentally, a sample deviation was introduced by covering the fluorescent spheres with a layer of vacuum grease on a slide. To correct the induced aberrations, a fluorescent sphere or a guide star in the center of the image field was selected for the model. The images were recorded with an individual fluorescent sphere in the field of view with the dimensions 60 μm×40 μm.

Optimization with an individual image of the fluorescent sphere and the corresponding individual SLM phase modulation often does not yield satisfactory results since a plurality of possible phase modulations can produce similar planar PSF images.

In order to limit the optimization process, the fluorescent sphere was irradiated with a set of different excitation modulations by phase patterns randomly generated by the SLM 120 and the resulting changes in the distorted fluorescent sphere were imaged.

A total of 20 such pairs of SLM phase aberrations were measured and corresponding two-photon images were used as input for the computational model (recorded by photon counting at a frame rate of 30 Hz, with a control loop that controls the SLM at 2 Hz). Optimizing the model to find the unknown aberration phase function with these 20 images took about 90 seconds. The calculated distortion was then inverted by multiplying by −1, and this correction was shown on the SLM 120 to correct the distortion.

Figure 3:
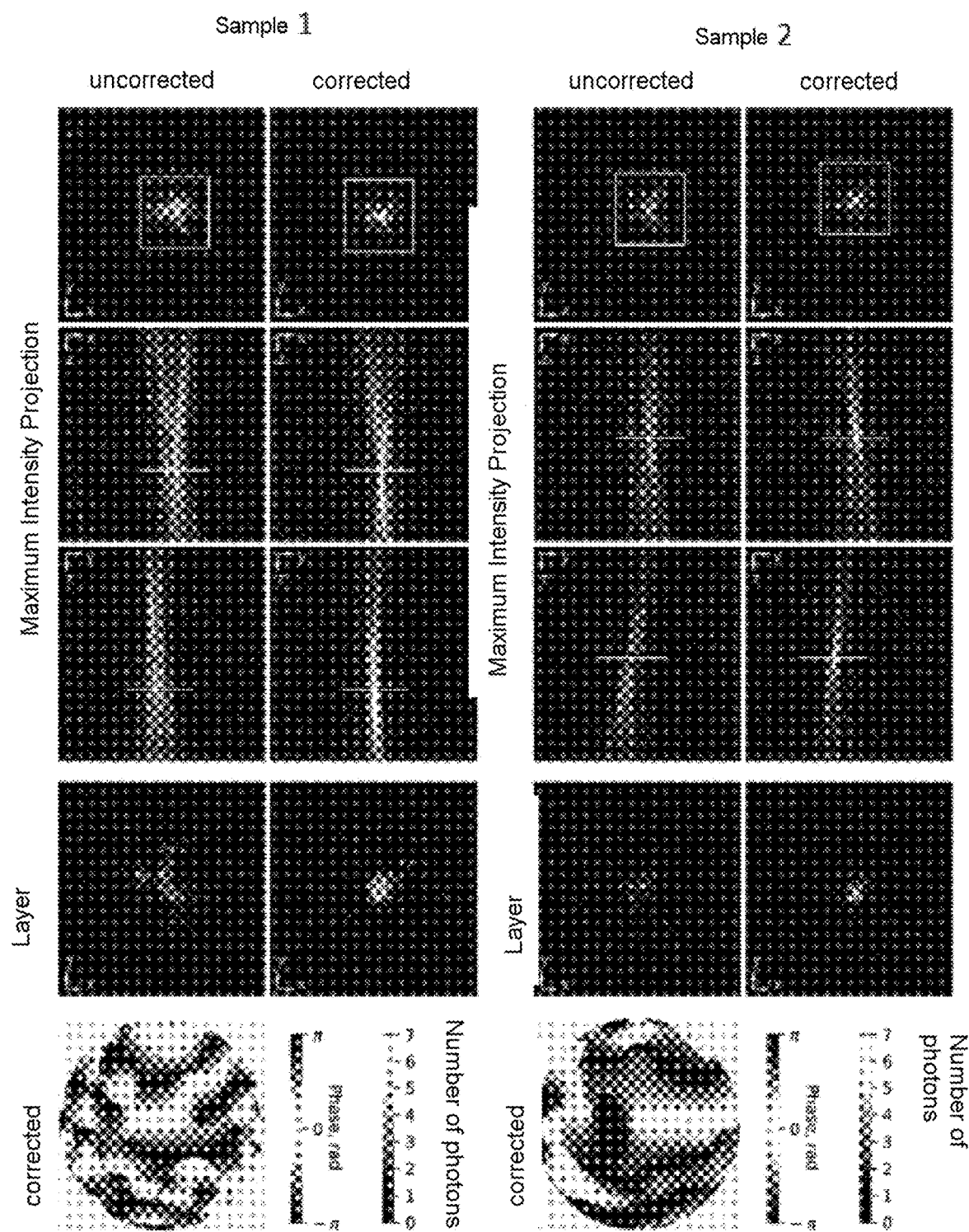
FIG. 3 shows a correction according to the present invention of the distortions of the incoming input-light distribution during the passage of the light distribution through a scattering body.

Two representative results of this method are shown in FIG. 3.

FIG. 3 shows two-photon volume images of the fluorescent sphere before and after the correction. Top row: projection of the volume image of a fluorescent sphere in the axial (z) direction. Second and third rows: projections along the x and y axes. Fourth row: volume section at maximum focus intensity for each of the volumes, size is 13×13 μm. Bottom row: corrections that are shown on the SLM 120.

The first three rows in FIG. 3 show three orthogonal projections of the fluorescent sphere 145 recorded before and after the correction in a volume with an axial increment of 0.25 μm between the planes. The fourth row shows the volume section of the focus at maximum intensity (in the axial direction, indicated by the white frames and lines in the top three rows). The bottom row shows the correction phase functions that resulted from the optimization model. The corrections thus resulted in an improved focus, which confirms that the found parameters reflect the distortions caused by the scattering body and allow these distortions to be corrected.

The present invention is not limited to embodiments described herein; reference should be had to the appended claims.

LIST OF REFERENCE NUMERALS

100 Optical system/Microscope
110 Input-light distribution $I_0$
115 Pulsed laser
120 Spatial light modulator (SLM)
125 Deflection mirror arrangement
130 Excitation path
135 Beam splitter
140 Scattering body
145 Fluorescence-capable body/Fluorescent spheres
160 Photomultiplier/Camera
165 Second spatial light modulator
170 Computer unit
175 Lens
180 Lens

What is claimed is:
1. A method for optimizing parameters of a physical light propagation model, the method comprising:
making available a physical model of a light propagation in an optical system;
radiating an input-light distribution into an excitation path of the optical system using an illumination unit;
passing the input light distribution through a scattering body, wherein the scattering body is placed in the excitation path of the optical system so that the input-light distribution is changed to a reflection-light distribution;
recording the reflection-light distribution;

transferring the recorded reflection-light distribution to the physical model; and calculating distortion parameters of the physical model based on the reflection-light distribution, wherein the distortion parameters characterize the scattering body, wherein, the reflection-light distribution is at least partially reflected as fluorescence radiation by a fluorescence-capable body within the scattering body, and a shape of the fluorescence-capable body and/or fluorescence excitation states of the fluorescence-capable body are known.

2. The method as recited in claim 1, wherein, the physical light propagation model is a light propagation model in a laser microscopy in a raster-scanning method, and the optical system is a microscope.

3. The method as recited in claim 1, wherein a focus of the input-light distribution is greater than a spatial extent of the fluorescence-capable body orthogonal to a direction of the radiating.

4. The method as claimed in claim 1, wherein the fluorescence-capable body is spherical.

5. The method as recited in claim 1, wherein, the input-light distribution which is radiated into an excitation path of the optical system is a 2-photon fluorescence, and the 2-photon fluorescence is used to excite the fluorescence-capable body.

6. The method as recited in claim 1, wherein the reflection-light distribution is recorded with a camera or with a photomultiplier.

7. The method as recited in claim 6, wherein the recording of the reflection-light distribution with the camera or with the photomultiplier is performed at a virtual location of a sample.

8. The method as recited in claim 1, wherein an n-fold variation of the input-light distribution $I_0$ generates an n-fold reflection-light distribution data set.

9. The method as recited in claim 1, further comprising:

making the physical model available on a computer unit; and automatically calculating, via an algorithm implemented on the computer unit, the distortion parameters of the physical model.

10. The method as recited in claim 1, wherein a mathematically differentiable model is used as the physical model of the physical light propagation.

11. The method as recited in claim 1, further comprising:

calculating transmission distortion parameters and/or reflection distortion parameters of the physical model based on the recorded reflection-light distribution, wherein, the reflection-light distribution is the light distribution that again passes through the scattering body after having been reflected by the fluorescence-capable body within the scattering body.

12. The method as recited in claim 1, wherein the input-light distribution is known and defined.

13. An irradiation apparatus for performing the method as recited in claim 1, the irradiation apparatus comprising:

a microscope comprising:

the illumination unit which is configured to generate the input-light distribution, and the excitation path with the scattering body arranged therein, the excitation path being configured to guide the input-light distribution to a location of a sample;

a photomultiplier which is configured to record the reflection-light distribution reflected by the scattering body;

a computer unit, wherein the physical model of the physical light propagation in the irradiation apparatus is made available on the computer unit, and wherein an algorithm implemented on the computer unit is configured to calculate, based on the physical model and the reflection-light distribution, the distortion parameters of the physical model, wherein, the fluorescence-capable body is provided within the scattering body, and the reflection-light distribution is at least in part reflected as fluorescence radiation by the fluorescence-capable body within the scattering body.

14. The irradiation apparatus as recited in claim 13, wherein the illumination unit is a laser.

15. A method for correcting distortions of a light distribution during a passage through an optical system having a scattering body, the method comprising:

making available a physical model of a light propagation in an optical system;

radiating an input-light distribution into an excitation path of the optical system using an illumination unit;

passing the input light distribution through a scattering body, wherein the scattering body is placed in the excitation path of the optical system so that the input-light distribution is changed to a reflection-light distribution;

recording the reflection-light distribution;

transferring the recorded reflection-light distribution to the physical model; and calculating a distortion parameter of the physical model based on the reflection-light distribution, wherein the distortion parameter characterizes the scattering body; and setting a complementary distortion pattern on an optical modulator of the excitation path, wherein, the reflection-light distribution is at least partially reflected as fluorescence radiation by a fluorescence-capable body within the scattering body, a shape of the fluorescence-capable body and/or fluorescence excitation states of the fluorescence-capable body are known, and the optical modulator is arranged upstream of the scattering body in a beam direction.

16. The method as recited in claim 15, wherein the method is performed during a laser microscopy in a raster-scanning method when irradiating a sample.

17. The method as recited in claim 15, further comprising:

calculating transmission distortion parameters and/or reflection distortion parameters of the physical model based on the recorded reflection-light distribution, wherein the reflection-light distribution is the light distribution that again passes through the scattering body after having been reflected by the fluorescence-capable body within the scattering body, extracting the transmission distortion parameters and/or the reflection distortion parameters; and setting corresponding complementary transmission distortion parameters and/or corresponding complementary reflection distortion parameters on one optical modulator and/or on two optical modulators in a detection path.

18. The method as recited in claim 15, wherein the input-light distribution is known and defined.

19. An irradiation apparatus for performing the method as recited in claim 15, the irradiation apparatus comprising:
- a microscope comprising:
    - an illumination unit which is configured to generate a light distribution, and
    - an excitation path with a scattering body arranged therein, the excitation path being configured to guide the light distribution to a location of a sample;
- an optical modulator arranged in the excitation path in a direction of a light propagation upstream of the scattering body; and
- a computer unit which is configured to control the optical modulator,
- wherein,
- the computer unit is configured to extract distortion parameters from a physical model of the light propagation in the irradiation apparatus and to set the optical modulator with a complementary distortion pattern which corrects distortions due to the scattering body.

20. The irradiation apparatus as recited in claim 19, wherein the illumination unit is a laser.

* * * * *